(12) United States Patent
Fujimoto et al.

(10) Patent No.: US 9,074,116 B2
(45) Date of Patent: Jul. 7, 2015

(54) FLUORORUBBER COMPOSITION

(75) Inventors: Kenichi Fujimoto, Ibaraki (JP); Tamotsu Oi, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/395,191

(22) PCT Filed: Sep. 8, 2010

(86) PCT No.: PCT/JP2010/065386
§ 371 (c)(1),
(2), (4) Date: Mar. 9, 2012

(87) PCT Pub. No.: WO2011/030777
PCT Pub. Date: Mar. 17, 2011

(65) Prior Publication Data
US 2012/0172513 A1    Jul. 5, 2012

(30) Foreign Application Priority Data

Sep. 14, 2009   (JP) .................................. 2009-211190

(51) Int. Cl.
C08K 3/22      (2006.01)
C08K 5/14      (2006.01)
C09K 3/10      (2006.01)

(52) U.S. Cl.
CPC ................ C09K 3/1009 (2013.01); C08K 3/22 (2013.01); C08K 5/14 (2013.01)

(58) Field of Classification Search
USPC ............................. 524/432; 277/500; 264/299
See application file for complete search history.

(56) References Cited

U.S. PATENT DOCUMENTS 5,483,000 A  *  1/1996  Kaneko et al. ................. 525/102
6,576,311 B2 *  6/2003  Noguchi et al. ............. 428/36.91
7,279,530 B2 *  10/2007 Higashira et al. .......... 525/326.3
2002/0099142 A1   7/2002  Faulkner
2011/0291365 A1 * 12/2011 Hirose ........................... 277/500

FOREIGN PATENT DOCUMENTS

| JP | 06-299027   | * | 10/1994 |
| JP | 2001-131346 |   | 5/2001  |
| JP | 2002-179808 | * | 6/2002  |
| JP | 2006-299224 | * | 11/2006 |
| JP | 2007-169511 |   | 7/2007  |
| JP | 2007-269862 | * | 10/2007 |
| JP | 2009-102571 | * | 5/2009  |

OTHER PUBLICATIONS

International Search Report from corresponding PCT application No. PCT/JP2010/065386 dated Nov. 30, 2010 (4 pgs).
International Preliminary Report on Patentability and Written Opinion from corresponding PCT application No. PCT/JP2010/065386 (8 pgs).

* cited by examiner

Primary Examiner — Peter D Mulcahy
Assistant Examiner — Henry Hu
(74) Attorney, Agent, or Firm — Brinks Gilson & Lione

(57) ABSTRACT

Disclosed is a fluororubber composition comprising (A) 100 parts by weight of a peroxide-crosslinkable fluororubber, (B) 1 to 15 parts by weight of ZnO, (C) at least one of a basic metal hydroxide and a metal oxide other than ZnO at a weight ratio of 0.5 or more with respect to the weight of ZnO, and (D) 0.5 to 10 parts by weight of an organic peroxide. When used for contact with biodiesel fuel, the peroxide-crosslinkable fluororubber composition effectively prevents material degradation shown in BDF while maintaining excellent compression set characteristics due to the addition of ZnO, as in conventional peroxide-crosslinkable fluororubbers, and therefore can be suitably used as, for example, a vulcanization molding material for sealing materials.

6 Claims, No Drawings

FLUORORUBBER COMPOSITION

RELATED APPLICATION

This application is a 35 U.S.C. §371 national phase filing of International Patent Application No. PCT/JP2010/065386, filed Sep. 8, 2010, through which and to which priority is claimed under 35 U.S.C. §119 to Japanese Patent Application No. 2009-211190, filed Sep. 14, 2009.

TECHNICAL FIELD

The present invention relates to a fluororubber composition. More particularly, the present invention relates to a fluororubber composition that can be suitably used as, for example, a vulcanization molding material for sealing materials used for contact with biodiesel fuel.

BACKGROUND ART

Biodiesel fuel (hereafter abbreviated as BDF), which is an alternative fuel to petroleum, is obtained by etherifying raw material fat (fat and oil) with methanol to produce fatty acid methyl esters [FAME], and mixing FAME with conventional light oil. The mixing ratio of FAME is generally about 3 to 90 volume % in the total amount of FAME and light oil. Although various animal and vegetable fats are used as the raw material fat, vegetable-derived fats, such as rapeseed oil, soybean oil, palm oil, coconut oil, and sunflower oil, are the current mainstream.

As for FAME for use in BDF, various products have been proposed in the past; however, the type and amount of BDF widely vary depending on the area where BDF is used. Therefore, fluororubbers are suitably used as rubber materials that can correspond to all of such variations.

More specifically, as a rubber composition having fuel oil resistance (sour fuel resistance), biofuel resistance (rapeseed oil resistance), and ozone resistance, and usable as an inner tube rubber of a fuel rubber hose, Patent Document 1 proposes a sulfur-vulcanizable rubber composition comprising 2 to 5 parts by weight of magnesium oxide based on 100 parts by weight of hydrogenated NBR-polyvinyl chloride blended material. The reference example of Patent Document 1 describes a fluororubber composition prepared by compounding 3 parts by weight of MgO, 6 parts by weight of $Ca(OH)_2$, and 3 parts by weight of CaO to a non-sulfur-vulcanizable fluororubber (a product of Daikin Industries, Ltd., which is considered to be a polyol-vulcanizable fluororubber). Patent Document 1 indicates that although this fluororubber composition satisfies material performance and product performance, the cost is high.

Further, Patent Document 2 proposes a rubber molded product used for contact with engine oil, prepared by containing an amphoteric oxide (a compound generally acting as acid to base, and acting as base to acid) with a polyol-vulcanizable or peroxide-crosslinkable fluororubber. ZnO, $Al_2O_3$, and PbO, preferably ZnO, are used as amphoteric oxides. Moreover, an acid acceptor (an oxide or hydroxide of divalent metal) can be used in combination with such an amphoteric oxide. Examples 1 to 3 of Patent Document 2 describe polyol-vulcanizable fluororubber compositions comprising 6.5 parts by weight or 12 parts by weight of ZnO, 5 parts by weight of $Ca(OH)_2$, and 3 parts by weight of MgO, based on 100 parts by weight of fluorine-containing copolymer. However, as for the peroxide-crosslinkable fluororubber, an example only compounding ZnO (amphoteric oxide) is described.

The present applicant has proposed using a ZnO acid acceptor in a peroxide-crosslinkable fluororubber composition for improving fuel oil resistance etc., (see Patent Document 3). Further, acid acceptors, such as $Ca(OH)_2$, MgO, and ZnO, are used in a peroxide-crosslinkable fluororubber composition for reducing the coefficient of friction (see Patent Document 4).

However, when peroxide-crosslinkable fluororubbers are used for BDF applications, the addition of ZnO causes a problem of material degradation, such as rubber swelling.

PRIOR ART DOCUMENT

Patent Document

Patent Document 1: JP-A-2007-269862
Patent Document 2: JP-A-2001-131346
Patent Document 3: JP-A-2006-299224
Patent Document 4: JP-A-2007-169511

OUTLINE OF THE INVENTION

Problem to be Solved by the Invention

An object of the present invention is to provide a peroxide-crosslinkable fluororubber composition that effectively prevents material degradation when used for contact with BDF, and that can be suitably used as, for example, a vulcanization molding material for sealing materials.

Means for Solving the Problem

The above object of the present invention can be achieved by a fluororubber composition comprising (A) 100 parts by weight of a peroxide-crosslinkable fluororubber, (B) 1 to 15 parts by weight of ZnO, (C) at least one of a basic metal hydroxide and a metal oxide other than ZnO at a weight ratio of 0.5 or more with respect to the weight of ZnO, and (D) 0.5 to 10 parts by weight of an organic peroxide.

Effect of the Invention

Peroxide-crosslinkable fluororubbers compounding ZnO have excellent compression set characteristics; however, the application thereof to BDF leads to an undesirable phenomenon that the volume expansion rate increases with time. This phenomenon is caused to that BDF undergoes oxidation degradation under the influence of oxygen, heat, moisture, etc., or degradation due to hydrolysis of fatty acid methyl esters, to produce fatty acids and methanol, and the fatty acids and ZnO are reacted to produce fatty acid-Zn compounds in the fluororubber. Thus, swelling is considered to increase with time because fatty acids or fatty acid-Zn compounds are produced in the fluororubber, and further, BDF is drawn into the fluororubber.

When the degradation further proceeds, blisters (swelling) may occur in fluororubber molded products. Moreover, as shown in the results of Comparative Example 8, described later, even a polyol-crosslinkable fluororubber molded product compounding ZnO, $Ca(OH)_2$, and MgO undergoes degradation due to BDF.

In contrast, the fluororubber composition of the present invention maintains excellent compression set characteristics due to the addition of ZnO, as in conventional peroxide-crosslinkable fluororubbers, while effectively preventing the above undesirable phenomenon shown in BDF.

The above undesirable phenomenon can be presumably avoided by preventing the generation of fatty acids, which are decomposition products of fatty acid methyl esters, or the subsequent production of fatty acid-Zn compounds. Based on this assumption, it has been found that the undesirable phenomenon can be effectively dealt with by using ZnO as component (B) in combination with at least one of a basic metal hydroxide and a metal oxide other than ZnO, as component (C), at a specific proportion.

By applying such a compounding technique, peroxide-crosslinkable fluororubber materials can be applied to BDF, similarly as with conventional diesel oil (light oil), and can be used regardless of the type and amount of BDF.

The fluororubber composition of the present invention having such characteristics can be suitably used as a seal product material, such as an O ring, gasket, packing, valve, oil seal, and the like, to be in contact with BDF. In addition to these applications, the fluororubber composition of the present invention can also be applied to a hose to be in contact with BDF and other industrial rubber products.

EMBODIMENTS FOR CARRYING OUT THE INVENTION

The fluororubber that can be crosslinked with peroxide (peroxide-crosslinkable fluororubber) as the component (A) may be any fluorine-containing elastomer that has a fluorine content of 63 to 71 wt. % and a Mooney viscosity $ML_{1+10}$ (121° C.) of 20 to 100, and that contains iodine and/or bromine as a crosslinking site in the molecule; and the following copolymer elastomers are preferably used.

A copolymer elastomer having a copolymerization composition of about 50 to 80 mol % of vinylidene fluoride, about 15 to 50 mol % of hexafluoropropene, and about 30 to 0 mol % of tetrafluoroethylene, into which an iodine and/or bromine group is introduced.

Practically, Viton GAL200S, GBL200S, GBL600S, GF200S, and GF600S produced by Du Pont, Tecnoflon P457, P757, P459, and P952 produced by Solvay Solexis, DAI-EL G952, G901, G902, G912, and G801 produced by Daikin Industries, Ltd., and other commercial products can be used as they are.

A copolymer elastomer having a copolymerization composition of about 50 to 85 mol % of vinylidene fluoride, about 5 to 50 mol % of perfluorovinylether represented by the general formula: $CF_2=CFORf$ (Rf: a perfluoroalkyl group having 1 to 10 carbon atoms, preferably a perfluoromethyl group or a perfluorooxyalkyl group having one or more ether bonds in the carbon chain), and about 50 to 0 mol % of tetrafluoroethylene, into which an iodine and/or bromine group is introduced.

Practically, Viton GLT200S, GLT600S, GBLT200S, GBLT600S, GFLT200S, and GFLT600S produced by Du Pont, Tecnoflon PL455, PL855, PL557, PL458, and PL958 produced by Solvay Solexis, DAI-EL LT302 and LT301 produced by Daikin Industries, Ltd., and the like can be used as they are.

The introduction of an iodine and/or bromine group for enabling peroxide crosslinking of the fluororubber can be carried out by a copolymerization reaction in the presence of an iodine and/or bromine group-containing saturated or unsaturated compound.

When a bromine and/or iodine group is contained as a side chain of a fluorine-containing copolymer, examples of such a copolymer include perfluoro(2-bromoethyl vinyl ether), 3,3,4,4-tetrafluoro-4-bromo-1-butene, 2-bromo-1,1-difluoroethylene, bromotrifluoroethylene, perfluoro(2-iodoethyl vinyl ether), iodotrifluoroethylene, and other crosslinking site-forming monomer.

When an iodine and/or bromine group is contained as the terminal group of a fluorine-containing copolymer, a fluoroalkylene compound halogenated at both ends represented by the general formula: $X_1C_nF_{2n}X_2$ ($X_1$:F, Br, or I; $X_2$:Br or I; and n: 1 to 12) is used. In terms of the balance of reactivity and handling, copolymers containing an iodine and/or bromine group derived from 1-bromoperfluoroethane, 1-bromoperfluoropropane, 1-bromoperfluorobutane, 1-bromoperfluoropentane, 1-bromoperfluorohexane, 1-iodoperfluoroethane, 1-iodoperfluoropropane, 1-iodoperfluorobutane, 1-iodoperfluoropentane, and 1-iodoperfluorohexane (n:1 to 6) are preferably used.

Moreover, when $X_1$ and $X_2$ are I and/or Br, a crosslinking site can be introduced into the terminal position of a fluorine-containing copolymer. Examples of such a compound include 1-bromo-2-iodotetrafluoroethane, 1-bromo-3-iodoperfluoropropane, 1-bromo-4-iodoperfluorobutane, 2-bromo-3-iodoperfluorobutane, monobromomonoiodoperfluoropentane, monobromomonoiodoperfluoro-n-hexane, 1,2-dibromoperfluoroethane, 1,3-dibromoperfluoropropane, 1,4-dibromoperfluorobutane, 1,5-dibromoperfluoropentane, 1,6-dibromoperfluorohexane, 1,2-diiodoperfluoroethane, 1,3-diiodoperfluoropropane, 1,4-diiodoperfluorobutane, 1,5-diiodoperfluoropentane, 1,6-diiodoperfluorohexane, and the like. These compounds can also be used as chain transfer agents.

ZnO as the component (B) is zinc white JIS $1^{st}$ kind (purity: 99.8%, particle diameter: 0.3 to 0.7 μm), zinc white JIS $2^{nd}$ kind (purity: 99.8%, particle diameter: 0.3 to 0.7 μm), zinc white JIS $3^{rd}$ kind (purity: 99.5%, particle diameter: 0.3 to 0.8 μm), or active zinc white having a smaller particle diameter (purity: 90%, particle diameter: 0.1 μm or less). ZnO is used at a ratio of 1 to 15 parts by weight, preferably 3 to 10 parts by weight, based on 100 parts by weight of fluororubber. When the amount of ZnO is less than this range, the value of compression set is deteriorated; whereas when the amount is more than this range, material degradation (rubber swelling) occurs.

In the present invention, at least one of a basic metal hydroxide and a metal oxide other than ZnO is used as the component (C), in combination with ZnO as the component (B), at a weight ratio of 0.5 or more, preferably 0.5 to 2, with respect to the weight of ZnO. When the weight ratio of component (C) is less than this range, material degradation (rubber swelling) due to the addition of ZnO cannot be suppressed. Conversely, when the weight ratio is more than this range, no material degradation occurs; however, the proportion of ZnO is relatively lower, deteriorating compression set characteristics.

The basic metal hydroxide as the component (C) is a mono to trivalent metal hydroxide, such as alkali metal and alkaline earth metal. Examples thereof include $Ca(OH)_2$, $Ba(OH)_2$, $Mg(OH)_2$, $Cu(OH)_2$, $Fe(OH)_3$, KOH, NaOH, and the like; preferable are $Ca(OH)_2$ and $Ba(OH)_2$. Moreover, the metal oxide other than ZnO is an acid-receiving metal oxide for rubber, such as MgO, CaO, BaO, CuO, $Na_2O$, $K_2O$, and other mono or divalent metal oxides; preferable is MgO. Similar to these hydroxides or oxides, carbonates or bicarbonates, such as $CaCO_3$, $Na_2CO_3$, and $NaHCO_3$, are also expected to have the same effect.

Examples of the organic peroxide as the component (D) include dicumyl peroxide, cumene hydroperoxide, p-methane hydroperoxide, 2,5-dimethylhexane-2,5-dihydroperoxide, di-tert-butyl peroxide, benzoyl peroxide, m-toluoyl peroxide, 2,5-dimethyl-2,5-di(tert-butylperoxy)hexane, 2,5-dimethyl-2,5-di(tert-butylperoxy)hexyne-3,1,3-di(tert-butylperoxyisopropyl)benzene, 2,5-dimethyl-2,5-dibenzoylperoxyhexane, (1,1,3,3-tetramethylbutylperoxy)-2-ethylhexanoate, tert-butyl peroxybenzoate, tert-butyl peroxylaurate, di(tert-butylperoxy)adipate, di(2-ethoxyethylperoxy)dicarbonate, bis-(4-tert-butylcyclohexylperoxy)dicarbonate, and the like. Such an organic peroxide is used at a ratio of 0.5 to 10 parts by weight, preferably 1 to 5 parts by weight, based on 100 parts by weight of fluororubber.

For the peroxide crosslinking of organic peroxide, it is preferable to use a polyfunctional unsaturated compound in combination. Examples of such a polyfunctional unsaturated compound include tri(meth)allyl isocyanurate, tri(meth)allyl cyanurate, triallyl trimellitate, N,N'-m-phenylenebismaleimide, diallyl phthalate, tris(diallylamine)-s-triazine, triallyl phosphite, ethyl ene glycol di(meth)acrylate, diethyleneglycol di(meth)acrylate, neopentylglycol di(meth)acrylate, trimethylolpropane tri(meth)acrylate, 1,3-polybutadiene, and other polyfunctional unsaturated compounds that improve mechanical strength, compression set, etc. Such a polyfunctional unsaturated compound is used at a ratio of about 0.1 to 20 parts by weight, preferably about 0.5 to 10 parts by weight, based on 100 parts by weight of fluororubber. Here, (meth) allyl refers to allyl or methallyl. Similarly, (meth)acrylate refers to acrylate or methacrylate.

The preparation of the composition is carried out in such a manner that components, other than the above components, generally used as rubber compounding agent (e.g., reinforcing agents or fillers, such as carbon black, silica, barium sulfate, talc, and clay; and processing aids, such as carnauba wax and sodium stearate) are suitably compounded, and the resulting mixture is kneaded using a closed type kneader (e.g., an intermix, kneader, or Banbury mixer) or an open roll to form a sheet-like rubber compound, followed by vulcanization molding using a vulcanizing press into a predetermined shape. Vulcanization is generally carried out by press vulcanization performed at about 100 to 250° C. for about 1 to 120 minutes, and oven vulcanization (secondary vulcanization) performed at about 150 to 250° C. for about 0 to 30 hours.

EXAMPLES

The following describes the present invention with reference to Examples.

Example 1

| | |
|---|---|
| Fluororubber (Viton GLT600S, produced by Du Pont; F content: 64%, $ML_{1+10}$ (121° C.): 65) | 100 parts by weight |
| ZnO (zinc white JIS 1$^{st}$ kind, produced by Hakusui Tech Co., Ltd.) | 6 parts by weight |
| Ca(OH)$_2$ (NICC5000, produced by Inoue Calcium Corporation) | 6 parts by weight |
| 2,5-dimethyl-2,5-di(tert-butylperoxy)hexane (Perhexa 25B, produced by NOF Corporation; 25% concentration) | 4 parts by weight |
| N990 carbon black (produced by Engineered Carbon) | 25 parts by weight |
| Processing aid (VPA No. 3, produced by Du Pont) | 1 part by weight |
| Triallyl isocyanurate (TAIL, produced by Nippon Kasei Chemical Co., Ltd.) | 2 parts by weight |

The above components were kneaded by a 3 L kneader to prepare a sheet-like rubber compound. The rubber compound was subjected to press vulcanization at 170° C. for 10 minutes using a vulcanizing press, and to oven vulcanization (secondary vulcanization) at 220° C. for 22 hours, thereby obtaining a vulcanized rubber sheet (2 mm in thickness).

The obtained vulcanized rubber sheet test piece was tested for the following items:

Normal state physical value, low-temperature characteristics: according to JIS K6251 corresponding to ISO 37 and ASTM D412; JIS K6253: 1997 corresponding to ISO 48 and ASTM D1415 (Hardness Duro A: is indicates the value measured after one second); and JIS K6261 corresponding to ISO 2921 and ASTM D1329

Compression set: according to JIS K6262 corresponding to ISO 815 and ASTM D395

Immersion test: according to JIS K6258 corresponding to ISO 1817 and ASTM D471; The test piece was immersed in rapeseed oil-based BDF30 or 50, soybean oil-based BDF30, or palm oil-based BDF30, and volume changes were measured at 150° C. after 168 hours or 500 hours. (BDF30 and BDF50 as used herein mean that the volume ratio of fatty acid methyl esters derived from raw material fat to light oil is 30/70 and 50/50, respectively.)

Example 2

In Example 1, the amount of calcium hydroxide was changed to 4 parts by weight.

Example 3

In Example 1, the amount of calcium hydroxide was changed to 8 parts by weight.

Comparative Example 1

In Example 1, calcium hydroxide was not used.

Comparative Example 2

In Example 1, the amount of calcium hydroxide was changed to 2.5 parts by weight.

Comparative Example 3

In Example 1, ZnO and Ca(OH)$_2$ were not used, but 5 parts by weight of MgO (MgO #150, produced by Kyowa Chemical Industry Co., Ltd.) was used.

Comparative Example 4

In Example 1, Ca(OH)$_2$ was not used, but 2.5 parts by weight of MgO was used.

Table 1 below shows the measurement results obtained in the above Examples and Comparative Examples, together with the compounding amounts of ZnO, Ca(OH)$_2$, and MgO.

TABLE 1

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| [Compounding component] | | | | | | | | |
| ZnO | (part by weight) | 6 | 6 | 6 | 6 | 6 | — | 6 |
| $Ca(OH)_2$ | (part by weight) | 6 | 4 | 8 | — | 2.5 | — | — |
| MgO | (part by weight) | — | — | — | — | — | 5 | 2.5 |
| [Measurement result] Normal state physical value | | | | | | | | |
| Hardness Duro A: 1s | (point) | 75 | 75 | 76 | 74 | 75 | 73 | 73 |
| Tensile strength | (MPa) | 17.0 | 16.9 | 17.8 | 16.5 | 17.3 | 16.7 | 16.0 |
| Elongation at break | (%) | 280 | 290 | 270 | 280 | 270 | 260 | 260 |
| Low-temperature characteristics | | | | | | | | |
| $TR_{10}$ | (°C.) | −30 | −30 | −30 | −30 | −30 | −30 | −30 |
| Compression set | | | | | | | | |
| 168 hrs | (%) | 15 | 16 | 18 | 12 | 15 | 36 | 16 |
| 500 hrs | (%) | 28 | 27 | 26 | 22 | 26 | 58 | 32 |
| Immersion test Rapeseed oil-based BDF30 | | | | | | | | |
| 168 hrs | (%) | +4.5 | +4.9 | +4.0 | +10.5 | +7.9 | +4.3 | +8.0 |
| 500 hrs | (%) | +6.5 | +7.0 | +6.0 | +34.8 | +18.4 | +6.3 | +17.9 |
| Rapeseed oil-based BDF50 | | | | | | | | |
| 168 hrs | (%) | +5.7 | +6.0 | +5.2 | +10.9 | +8.7 | +5.5 | +9.3 |
| 500 hrs | (%) | +7.1 | +7.5 | +6.5 | +36.9 | +20.2 | +6.9 | +21.5 |
| Soybean oil-based BDF30 | | | | | | | | |
| 168 hrs | (%) | +4.2 | +4.9 | +3.8 | +11.6 | +7.3 | +4.1 | +7.6 |
| 500 hrs | (%) | +5.8 | +6.0 | +5.1 | +38.6 | +16.4 | +6.1 | +17.0 |
| Palm oil-based BDF30 | | | | | | | | |
| 168 hrs | (%) | +4.7 | +4.9 | +4.3 | +12.1 | +7.7 | +4.6 | +7.8 |
| 500 hrs | (%) | +6.1 | +6.5 | +5.6 | +39.7 | +19.5 | +6.2 | +22.4 |

Example 4

| | |
|---|---|
| Fluororubber (Viton GFLT600S, produced by Du Pont; F content: 67%, $ML_{1+10}$ (121° C.): 65) | 100 parts by weight |
| ZnO (zinc white JIS 1st kind) | 4 parts by weight |
| $Ca(OH)_2$ (NICC5000) | 2 parts by weight |
| MgO (MgO #150) | 2 parts by weight |
| 1,3-di(tert-butylperoxyisopropyl)benzene (Perbutyl P, produced by NOF Corporation) | 1.2 parts by weight |
| $BaSO_4$ (produced by Sakai Chemical Industry Co., Ltd.) | 40 parts by weight |
| Talc (produced by Asada Milling Co., Ltd.) | 10 parts by weight |
| $Cr_2O_3$ (produced by Nippon Chemical Industrial Co., Ltd.; green pigment) | 5 parts by weight |
| Processing aid (VPA No. 3) | 2 parts by weight |
| Triallyl isocyanurate (TAIC) | 2.5 parts by weight |

Using the above components, kneading, vulcanization, and various tests were performed in the same manner as in Example 1.

Comparative Example 5

In Example 4, the amounts of $Ca(OH)_2$ and MgO were changed to 1 part by weight and 0.8 parts by weight, respectively.

Table 2 below shows the measurement results of Example 4 and Comparative Example 5.

TABLE 2

| | | Example 4 | Comparative Example 5 |
|---|---|---|---|
| [Measurement result] Normal state physical value | | | |
| Hardness Duro A: 1 s | (point) | 78 | 77 |
| Tensile strength | (MPa) | 14.7 | 15.0 |
| Elongation at break | (%) | 250 | 240 |
| Low-temperature characteristics | | | |
| $TR_{10}$ | (°C.) | −24 | −24 |
| Compression set | | | |
| 168 hrs | (%) | 25 | 22 |
| 500 hrs | (%) | 40 | 38 |
| Immersion test Rapeseed oil-based BDF30 | | | |
| 168 hrs | (%) | +3.8 | +6.0 |
| 500 hrs | (%) | +5.9 | +15.9 |
| Rapeseed oil-based BDF50 | | | |
| 168 hrs | (%) | +4.1 | +7.6 |
| 500 hrs | (%) | +6.2 | +18.5 |
| Soybean oil-based BDF30 | | | |
| 168 hrs | (%) | +3.6 | +5.8 |
| 500 hrs | (%) | +5.0 | +15.1 |
| Palm oil-based BDF30 | | | |
| 168 hrs | (%) | +3.6 | +6.5 |
| 500 hrs | (%) | +5.2 | +19.0 |

Example 5

| | |
|---|---|
| Fluororubber (Viton GBL600S, produced by Du Pont; F content: 68%, $ML_{1+10}$ (121° C.): 65) | 100 parts by weight |
| ZnO (zinc white JIS $1^{st}$ kind) | 5 parts by weight |
| Ba(OH)$_2$ (produced by Nippon Chemical Industrial Co., Ltd.) | 5 parts by weight |
| 2,5-dimethyl-2,5-di(tert-butylperoxy)hexane (Perhexa 25B) | 4 parts by weight |
| N990 carbon black | 25 parts by weight |
| Processing aid (VPA No. 3) | 1.5 parts by weight |
| Triallyl isocyanurate (TAIL) | 2 parts by weight |

Using the above components, kneading, vulcanization, and various tests were performed in the same manner as in Example 1.

Comparative Example 6

In Example 5, the amount of Ba(OH)$_2$ was changed to 1 part by weight.

Table 3 below shows the measurement results of Example 5 and Comparative Example 6.

TABLE 3

| | | Example 5 | Comparative Example 6 |
|---|---|---|---|
| [Measurement result] Normal state physical value | | | |
| Hardness Duro A: 1 s | (point) | 80 | 80 |
| Tensile strength | (MPa) | 18.0 | 16.9 |
| Elongation at break | (%) | 270 | 250 |
| Low-temperature characteristics | | | |
| $TR_{10}$ | (° C.) | −16 | −16 |
| Compression set | | | |
| 168 hrs | (%) | 20 | 19 |
| 500 hrs | (%) | 35 | 33 |
| Immersion test Rapeseed oil-based BDF30 | | | |
| 168 hrs | (%) | +3.6 | +9.5 |
| 500 hrs | (%) | +5.0 | +30.4 |
| Rapeseed oil-based BDF50 | | | |
| 168 hrs | (%) | +3.9 | +10.3 |
| 500 hrs | (%) | +6.3 | +38.2 |
| Soybean oil-based BDF30 | | | |
| 168 hrs | (%) | +3.0 | +8.1 |
| 500 hrs | (%) | +4.9 | +31.4 |
| Palm oil-based BDF30 | | | |
| 168 hrs | (%) | +3.4 | +8.9 |
| 500 hrs | (%) | +5.3 | +37.6 |

Example 6

| | |
|---|---|
| Fluororubber (DAI-EL LT 302, produced by Daikin Industries, Ltd.; F content: 64, $ML_{1+10}$ (121° C.): 45) | 100 parts by weight |
| ZnO (zinc white JIS $1^{st}$ kind) | 8 parts by weight |
| MgO (MgO #150) | 5 parts by weight |
| 2,5-dimethyl-2,5-di(tert-butylperoxy)hexane (Perhexa 25B) | 5 parts by weight |
| N990 carbon black | 5 parts by weight |
| Processing aid (VPA No. 3) | 1.5 parts by weight |
| Triallyl isocyanurate (TAIC) | 1.5 parts by weight |

Using the above components, kneading, vulcanization, and various tests were performed in the same manner as in Example 1.

Comparative Example 7

In Example 6, the amount of MgO was changed to 2 parts by weight.

Comparative Example 8

| | |
|---|---|
| Fluororubber (Viton E60C, produced by Du Pont; F content: 67%, $ML_{1+10}$ (121° C.): 60, polyol vulcanization type, vulcanizing agent-containing polymer) | 100 parts by weight |
| ZnO (zinc white JIS $1^{st}$ kind) | 6 parts by weight |
| Ca(OH)$_2$ (NICC5000) | 4 parts by weight |
| MgO (MgO #150) | 0.8 parts by weight |
| N990 carbon black | 15 parts by weight |
| Processing aid (VPA No. 3) | 1 part by weight |

Using the above components, kneading, vulcanization, and various tests were performed in the same manner as in Example 1.

Table 4 below shows the measurement results of Example 6 and Comparative Examples 7 and 8.

TABLE 4

| | | Ex. 6 | Comp. Ex. 7 | Comp. Ex. 8 |
|---|---|---|---|---|
| [Measurement result] Normal state physical value | | | | |
| Hardness Duro A: 1 s | (point) | 65 | 65 | 68 |
| Tensile strength | (MPa) | 14.2 | 14.7 | 12.6 |
| Elongation at break | (%) | 300 | 270 | 220 |
| Low-temperature characteristics | | | | |
| $TR_{10}$ | (° C.) | −30 | −30 | −16 |
| Compression set | | | | |
| 168 hrs | (%) | 22 | 18 | 8 |
| 500 hrs | (%) | 42 | 41 | 20 |
| Immersion test Rapeseed oil-based BDF30 | | | | |
| 168 hrs | (%) | +5.2 | +10.2 | +8.0 |
| 500 hrs | (%) | +6.8 | +45.7 | +32.4 |
| Rapeseed oil-based BDF50 | | | | |
| 168 hrs | (%) | +6.5 | +12.4 | +14.6 |
| 500 hrs | (%) | +7.3 | +50.2 | +43.2 |
| Soybean oil-based BDF30 | | | | |
| 168 hrs | (%) | +4.9 | +12.1 | +10.1 |
| 500 hrs | (%) | +6.2 | +48.7 | +36.1 |

TABLE 4-continued

|  |  | Ex. 6 | Comp. Ex. 7 | Comp. Ex. 8 |
|---|---|---|---|---|
| Palm oil-based BDF30 | | | | |
| 168 hrs | (%) | +5.1 | +11.6 | +9.6 |
| 500 hrs | (%) | +6.7 | +47.9 | +37.9 |

The above results show the following:

Examples 1 to 3

Compression set characteristics were excellent, and no degradation (swelling) due to BDF was observed.

Examples 4 to 6

Compression set characteristics were almost excellent, and no degradation (swelling) due to BDF was observed.

Comparative Examples 1 and 2

Although compression set characteristics were excellent, the proportion of ZnO was greater, and degradation phenomenon to BDF was observed. In particular, degradation phenomenon was significant in Comparative Example 1, in which no hydroxide etc. were used in combination.

Comparative Example 3

Although no degradation phenomenon due to BDF was observed, compression set characteristics were significantly deteriorated.

Comparative Example 4

Although compression set characteristics were excellent, the proportion of ZnO was greater, and degradation phenomenon due to BDF was observed.

Comparative Examples 5 to 7

Although compression set characteristics were almost excellent, degradation phenomenon due to BDF was observed.

The invention claimed is:

1. A sealing material obtained by vulcanization molding of a peroxide-crosslinkable fluororubber composition containing ZnO, wherein the fluororubber composition consist essentially of:
   (A) 100 parts by weight of a peroxide-crosslinkable fluororubber having a fluorine content of 63 to 71 wt. % and a Mooney viscosity ML1+10 (121° C.) of 20 to 100 and which contains iodine and/or bromine as a crosslinking site in the molecule;
   (B) 1 to 15 parts by weight of ZnO;
   (C) at least one of:
      i) a basic metal hydroxide; and
      ii) a metal oxide other than ZnO,
   wherein the total weight ratio of component (C) is 0.5 or more with respect to the weight of ZnO; and
   (D) 0.5 to 10 parts by weight of an organic peroxide.

2. The fluororubber composition according to claim 1, wherein the basic metal hydroxide is $Ca(OH)_2$ or $Ba(OH)_2$.

3. The fluororubber composition according to claim 1, wherein the metal oxide other than ZnO is MgO.

4. The fluororubber composition according to claim 1, wherein the component (C), which is at least one of a basic metal hydroxide and a metal oxide other than ZnO, is used at a weight ratio of 0.5 to 2.0 with respect to the component (B), which is ZnO.

5. The sealing material according to claim 1, which is used for contact with biodiesel fuel.

6. The sealing material according to claim 5, wherein the biodiesel fuel is a mixture of: i) light oil; and ii) fatty acid methyl esters, which fatty acid methyl esters are obtained by esterification of raw material fat and oil.

* * * * *